(12) United States Patent
Davis et al.

(10) Patent No.: US 7,136,277 B2
(45) Date of Patent: Nov. 14, 2006

(54) BASEPAN ASSEMBLY

(75) Inventors: Reggie Davis, Conley, GA (US);
Jeffrey K. Hudgins, Jr., Gainseville, GA (US); Brian Rusch, Suwanee, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 307 days.

(21) Appl. No.: 10/706,213

(22) Filed: Nov. 12, 2003

(65) Prior Publication Data

US 2004/0145837 A1    Jul. 29, 2004

Related U.S. Application Data

(60) Provisional application No. 60/427,311, filed on Nov. 12, 2002.

(51) Int. Cl.
*H02B 1/015* (2006.01)

(52) U.S. Cl. .................. 361/644; 361/637; 361/648; 361/658

(58) Field of Classification Search ............ 361/1, 361/644, 648–650, 652, 673; 174/97, 99 R
See application file for complete search history.

(56) References Cited

U.S. PATENT DOCUMENTS

| | | | |
|---|---|---|---|
| 2,985,710 A * | 5/1961 | Davis et al. .............. 174/99 B |
| 4,646,200 A * | 2/1987 | M'Sadoques et al. ....... 361/638 |
| 4,740,865 A * | 4/1988 | Barner ...................... 361/627 |
| 4,870,542 A | 9/1989 | Koslosky et al. ........... 361/355 |
| 4,916,574 A * | 4/1990 | Hancock et al. ............ 361/649 |
| 5,113,312 A | 5/1992 | Pratt et al. .................. 361/361 |
| 5,134,543 A | 7/1992 | Sharp et al. ................ 361/358 |
| 5,172,300 A | 12/1992 | Morby et al. ............... 361/355 |
| 5,696,664 A | 12/1997 | Rose .......................... 361/639 |
| 5,761,026 A | 6/1998 | Robinson et al. ........... 361/627 |
| 5,777,377 A | 7/1998 | Gilmore ..................... 257/584 |
| 5,805,414 A * | 9/1998 | Feldhaeusser ............... 361/637 |
| 5,894,404 A | 4/1999 | Vrnak et al. ................ 361/627 |
| 5,905,630 A | 5/1999 | Wetterling .................. 361/625 |
| 5,933,319 A | 8/1999 | Buckner et al. ............ 361/627 |
| 6,229,692 B1 | 5/2001 | Stendardo et al. .......... 361/627 |
| 6,266,232 B1 | 7/2001 | Rose et al. ................. 361/645 |
| 6,383,035 B1 | 5/2002 | Kasai .......................... 439/724 |
| 6,459,570 B1 * | 10/2002 | Buchanan ................... 361/648 |

* cited by examiner

*Primary Examiner*—Boris Chervinsky
*Assistant Examiner*—Robert J. Hoffberg
(74) *Attorney, Agent, or Firm*—Foley & Lardner LLP

(57) ABSTRACT

There is provided a method and a basepan assembly for a panel board. The basepan assembly comprises a basepan having a bottom portion and at least one sidewall. A first bus bar is mounted in the bottom portion of the basepan. A second bus bar is mounted to its side proximate the side wall of the basepan. The side wall can include fasteners to couple the second bus bar to the side wall.

30 Claims, 3 Drawing Sheets

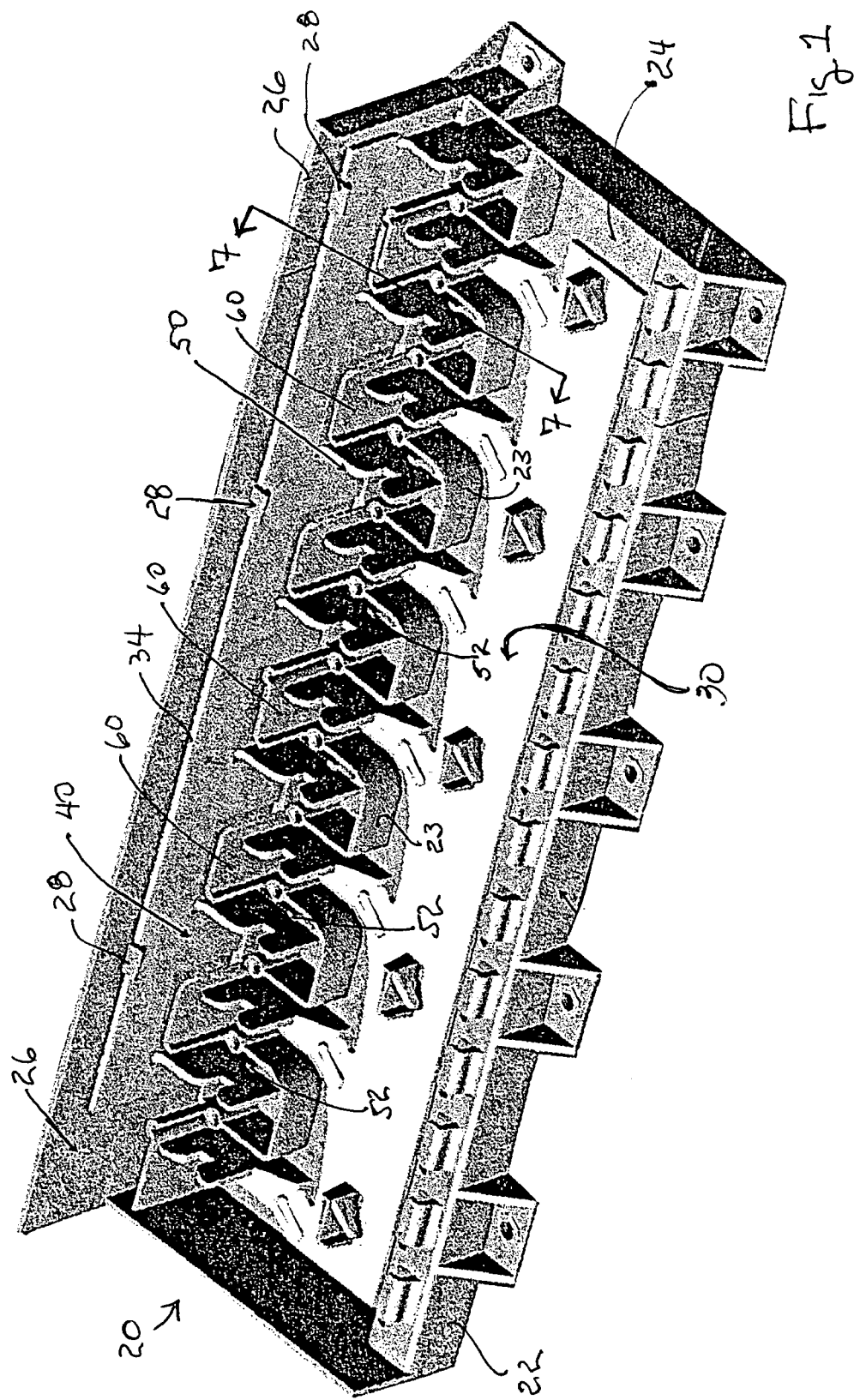

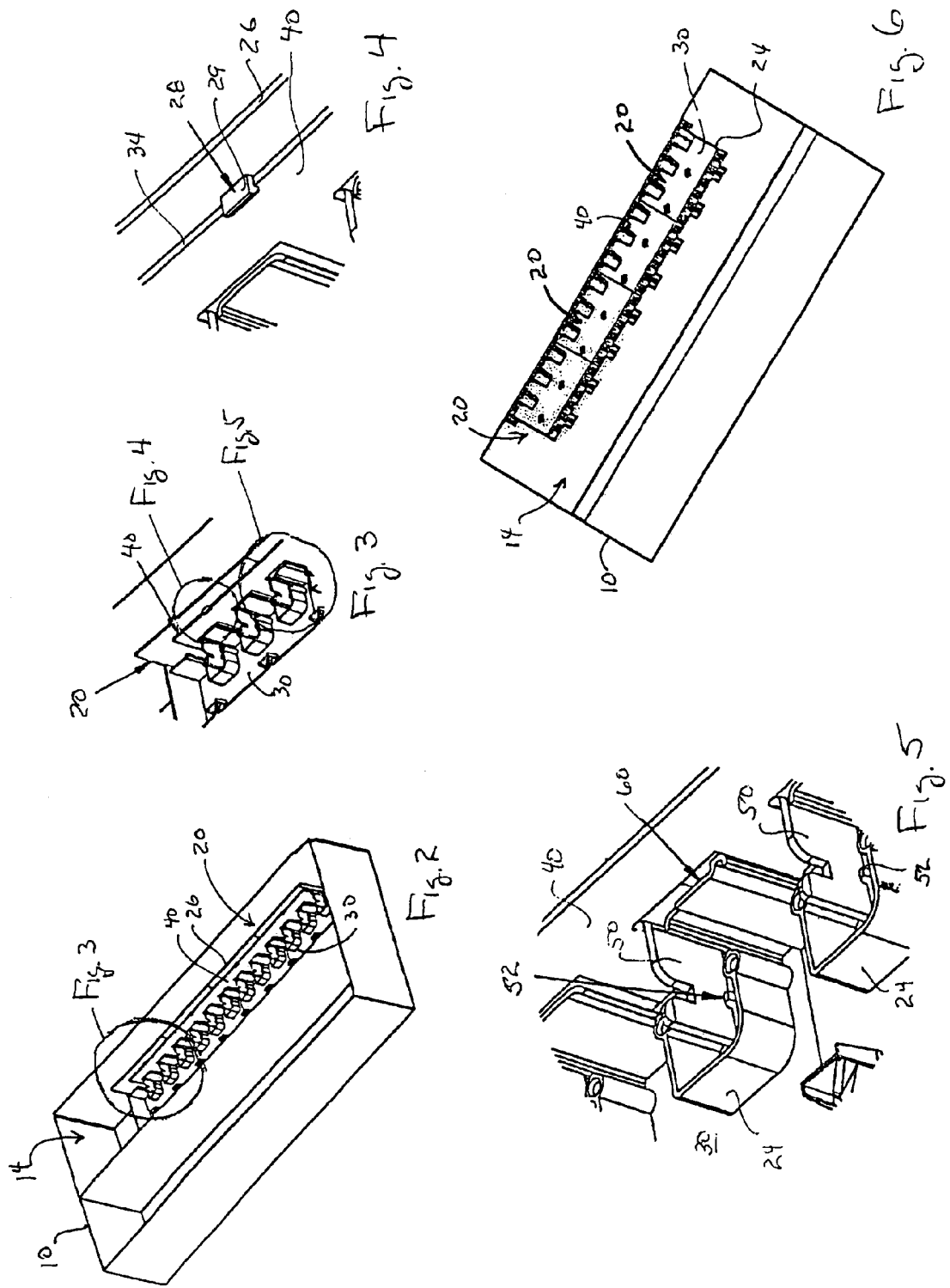

BASEPAN ASSEMBLY

CROSS-REFERENCE TO RELATED PATENT APPLICATIONS

This application claims the benefit of U.S. Provisional Application No. 60/427,311, filed Nov. 12, 2002 which is incorporated herein by this reference.

BACKGROUND OF THE INVENTION

The present invention relates generally to electrical distribution systems and, more particularly to a basepan assembly in an electrical panel board or load center.

Enclosures for electrical equipment, such as circuit breaker panel boards or load centers, are typically formed from metal or plastic. It is common to mount a bus bar in an enclosure for wiring circuit breakers as part of the electrical distribution system in a building, such as a residential dwelling or a commercial building. A problem of spacing exists when a load center bus bar is mounted in an enclosure. It is typical for the bus bar to be mounted in the back of the basepan. Such arrangement takes up space in the enclosure that cannot be used for the wiring from the circuit breakers. The lack of wiring space in the enclosure creates spacing problems for the user as well as creating difficulty in installing and maintaining the circuit breakers and wiring within an enclosure.

Thus, there is a need for a basepan which supports bus bars to improve the amount of wiring space available within an enclosure without increasing the overall size of the enclosure.

SUMMARY OF THE INVENTION

There is provided an exemplary embodiment of a basepan assembly for a panel board. The basepan assembly comprises a basepan having a bottom portion and at least one side wall. A first bus bar is mounted in the bottom portion of the basepan. A second bus bar is mounted proximate the side wall of the basepan. The side wall can include fasteners to couple the second bus bar to the side wall.

There is also provided an exemplary embodiment of a load center. The load center comprises an enclosure defining an interior space and a basepan assembly mounted in the enclosure. The basepan assembly comprises a basepan having a bottom portion and at least one side wall. A first bus bar is mounted in the bottom portion of the basepan. A second bus bar is mounted proximate the side wall.

There is also provided a method for mounting a bus bar in a basepan having a bottom portion and a sidewall. The method includes the steps of providing a bus bar having a bottom edge and a top edge. Providing a groove in the bottom portion proximate the side wall of the basepan. Providing a fastener mounted on the side wall. Installing the bus bar bottom edge in the groove. Coupling the bus bar to the side wall with the fastener. The method may also include the step of deflecting the sidewall during installation of the bus bar. Another method may include the step of engaging a snap-type member over the top edge of the bus bar.

BRIEF DESCRIPTION OF THE DRAWINGS

FIG. 1 is a perspective view of an exemplary embodiment of a basepan assembly, including a first bus bar mounted in the basepan along a bottom portion of the basepan and having a second bus bar coupled to a side wall of the basepan by fasteners, with the second bus bar aligned 90° from the first bus bar.

FIG. 2 is a perspective view of a panel board (load center) including an exemplary embodiment of a basepan assembly mounted therein.

FIG. 3 is a partial detailed view of the basepan assembly illustrated in FIG. 2.

FIG. 4 is a partial detailed view of a bus bar coupled to a side wall of a basepan assembly by a snap-type fastener.

FIG. 5 is a partial detailed view of the basepan assembly illustrated in FIG. 2 illustrating an exemplary embodiment of a phase barrier, bus barrier, bus stab, and stab stop.

FIG. 6 is a top plan view of an exemplary embodiment of an enclosure including a basepan having a side mounted bus bar.

DETAILED DESCRIPTION OF EXEMPLARY EMBODIMENTS

Figure 7:
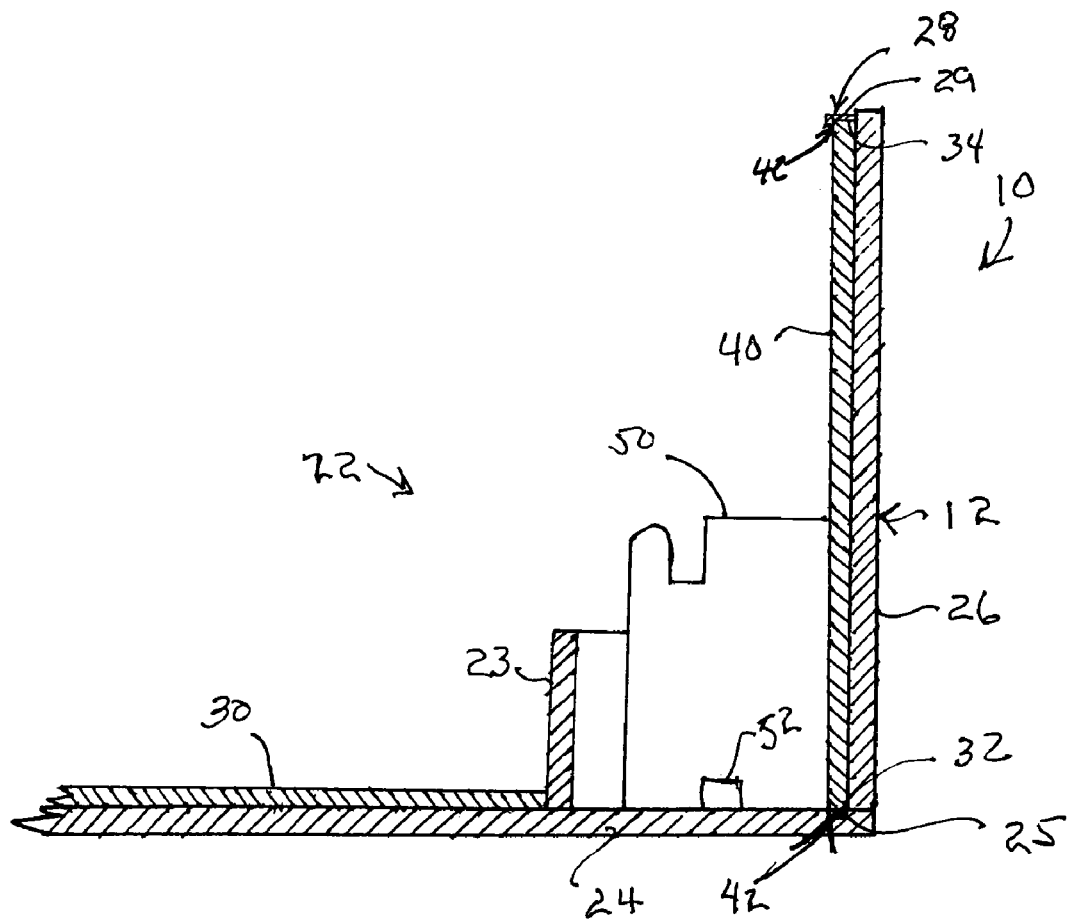
FIG. 7 is a partial sectional view along the line 7—7 illustrated in FIG. 1 of a side mounted bus bar coupled to the side wall of a basepan assembly.

Referring to the FIGS. 1–7, there are illustrated exemplary embodiments of a base pan assembly 20 for a panel board 10. It should be noted that a panel board 10 may also be referred to as a load center. The basepan assembly 20 provides for a side mounted bus bar, herein illustrated as a second bus bar 40 mounted on its side proximate the side wall 26 of a basepan 22. The basepan 22 and the bus bar 40 are configured in conjunction with one another as a system. With the bus bar 40 mounted on its side portion 42, the bus bar 40 does not have a provision for mounting it on the back or bottom portion 24 of the basepan 22. The basepan 22 must provide a way to install and retain the bus bar 40.

The basepan 22 is configured with a groove 25 formed in the bottom portion 24 of the basepan 22. (See FIG. 7.) It is also contemplated that the groove 25 can be formed by a pair of parallel ridges formed on the bottom portion 24 of the basepan 22. The groove 25 may be continuous or may be segmented and extend along the full length of the basepan 22 or may extend the same length as the bus bar 40.

The basepan assembly 20 for the panel board 10 comprises the basepan 22 with the bottom portion 24 and at least one side wall 26. The side wall includes fasteners 28. The fasteners 28 are used to couple the bus bar 40 to the side wall 26 of the basepan 22.

The base pan assembly 20 further includes a bus bar 30 mounted in the bottom portion 24 of the basepan 22 and a second bus bar 40 mounted proximate the side wall 26. The fasteners 28 secure the second bus bar 40 to the side wall 26. The fasteners 28 can be integrally formed with the side wall 26 or they may be mounted separately on the sidewall 26. One exemplary embodiment of the fastener 28 is a snap-type fastener as illustrated in FIGS. 4 and 7. The second bus bar 40 is inserted into the groove 25. The side wall 26 deflects during the bus bar 40 insertion until the top edge 34 of the second bus bar 40 clears the snap-type fastener 29. Once the basepan assembly 20 is installed in the enclosure 12, the side wall of the enclosure prevents deflection of the side wall 26 of the basepan 22.

The first and second bus bars 30, 40 are configured with a plurality of bus stabs 50. (See FIGS. 1 and 5.) The basepan 22 is also provided with a plurality of stab stops 52 to locate and position the bus stabs 50 of the second bus bar 40. (See FIGS. 1 and 5.) The stab stops 52 can be integrally formed with the bus pan 22 during the bus pan fabrication. An exemplary embodiment of the bus pan assembly 20, with the bus tabs 50 of the first and second bus bars 30, 40 aligned 90° from each other is illustrated in FIG. 1.

The buspan assembly 20 is typically installed in the interior space 14 of an enclosure 20 of a panel board or load center 10.

The buspan assembly 20 may include a plurality of phase barriers 60. The phase barrier 60 may be integrally formed with the basepan 22 during its fabrication. During an operation of the circuit breaker, energized plasma which vents from the circuit breaker could short circuit other circuit breakers in the enclosure 12. The phase barrier 60 prevents the venting of the energized plasma onto a bus bar of opposite plurality. Likewise, bus barriers 23 are provided in the basepan 22 and can be integrally formed during fabrication during the bus ban. The basepan 22 can be fabricated, for example, by molding from plastic or other suitable material capable of providing the necessary strength and electrical integrity of the basepan 22.

It should be understood that because of the variety of panel board and load center circuitries, the basepans 22 and base pan assemblies 20 can be configured as individual modules. The basepan assembly 20 modules allow for basepan assemblies to provide the number of circuits needed for a variety of applications.

There is also provided a method for mounting a bus bar 40 in a basepan 22, with the basepan 22 having a bottom portion 24 and a side wall 26. The method includes providing a bus bar 40 having a bottom edge 32 and a top edge 34. Providing a groove 25 in the bottom portion 24 of the basepan 22 proximate the side wall 26 of the basepan 22. As described above the groove 25 can be formed in the bottom portion 24 or it can be formed by raised ridges on the bottom portion 24. The fasteners 28 are mounted on the side wall 26 and configured to engage a side portion 42 of the bus bar 40. Installing the bus bar bottom edge 32 in the groove 25 and coupling the bus bar 40 to the side wall 26 with the fastener 28. A plurality of fasteners can be provided at selected intervals along the length of the bus bar 40.

Thus there has been provided a bus pan assembly for a panel board (load center) that allows the mounting of a bus bar on its side without the need for bus bar mounting provisions on the back of the basepan. This configuration also allows moving of the circuit breakers to be closer to the side wall of an enclosure thereby increasing the wiring space within the enclosure for maintenance and installation of circuitry within the enclosure. From the foregoing, it can be observed that numerous variations and modifications may be effected without departing from the true spirit and scope of the novel concepts of the above disclosure. It should be understood that no limitation with respect to the specific embodiments illustrated herein is intended or should be inferred. The terms and expressions have been employed herein and used as terms of description not of limitation and there is no intention in the use of such terms and expressions of excluding any equivalence of the features shown and described with portions thereof but is to recognize that various modifications are possible within the scope of the appended claims.

What is claimed is:

1. A basepan assembly for a panel board, the basepan assembly comprising:
   a basepan having a bottom portion and a least one side wall;
   a first bus bar mounted in the bottom portion of the basepan; and
   a second bus bar mounted on a side portion of the second bus bar proximate the side wall and aligned 90° from the first bus bar, wherein, with the basepan coupled to the panel board, the panel board prevents deflection of the sidewall of the basepan.

2. The basepan assembly of claim 1, wherein the first and second bus bar include a plurality of bus stabs.

3. The basepan assembly of claim 1, wherein the sidewall includes fasteners coupling the second bus bar to the sidewall.

4. The basepan assembly of claim 1, wherein the basepan includes a plurality of phase barriers.

5. The basepan assembly of claim 4, wherein the phase barriers are integrally formed with the basepan.

6. The basepan assembly of claim 3, wherein the fasteners are integrally formed with the sidewall.

7. The basepan assembly of claim 1, wherein the basepan includes a groove configured to receive the second bus bar.

8. The basepan assembly of claim 7, wherein the groove is the same length as the second bus bar.

9. The basepan assembly of claim 2, wherein the basepan includes a plurality of stab stops to locate and position the bus stabs of the second bus bar.

10. The basepan assembly of claim 9, wherein the stab stops are integrally formed with the basepan.

11. The basepan assembly of claim 2, wherein the bus stabs of the first and second bus bars are aligned ninety degrees from each respective bus bar.

12. The basepan assembly of claim 1, wherein the second bus bar includes a side portion configured to support the second bus bar along side the sidewall.

13. A load center comprising:
   an enclosure defining an interior space; and
   a basepan assembly mounted in the enclosure, the basepan assembly comprising:
   a basepan having a bottom portion and at least one side wall;
   a first bus bar mounted in the bottom portion of the basepan; and
   a second bus bar mounted on a side portion of the second bus bar proximate the side wall and aligned 90° from the first bus bar, wherein the enclosure prevents deflection of the sidewall of the basepan mounted in the enclosure.

14. The load center of claim 13, wherein the first and second bus bar include a plurality of bus stabs.

15. The load center of claim 13, wherein the sidewall includes fasteners coupling the second bus bar to the sidewall.

16. The load center of claim 13, wherein the basepan includes a plurality of phase barriers.

17. The load center of claim 16, wherein the phase barriers are integrally formed with the basepan.

18. The load center of claim 15, wherein the fasteners are integrally formed with the sidewall.

19. The load center of claim 13, wherein the basepan includes a groove configured to receive the second bus bar.

20. The load center of claim 19, wherein the groove is the same length as the second bus bar.

21. The load center of claim 14, wherein the basepan includes a plurality of stab stops to locate and position the bus stabs of the second bus bar.

22. The load center of claim 21, wherein the stab stops are integrally formed with the basepan.

23. The load center of claim 14, wherein the bus stabs of the first and second bus bars are aligned ninety degrees from each respective bus bar.

24. The load center of claim 13, wherein the second bus bar includes a side portion configured to support the second bus bar along side the sidewall.

25. The load center of claim 13, including at least one additional basepan assembly.

26. A method for mounting a bus bar in a basepan having a bottom portion and a sidewall, the method including the steps of:
   providing a bus bar having a bottom edge and a top edge;
   providing a groove in the bottom portion proximate the sidewall;
   providing a fastener mounted on the sidewall;
   installing the bus bar bottom edge in the groove;
   deflecting the sidewall during installation of the bus bar;
   coupling the top edge of the bus bar to the sidewall with the fastener; and
   installing the basepan in an enclosure, wherein the enclosure prevents deflection of the sidewall of the installed basepan.

27. The method of claim 26, wherein the groove is at least as long as the side portion of the bus bar.

28. The method of claim 26, including the step of deflecting the sidewall during installation of the bus bar.

29. The method of claim 28, wherein the fastener is a snap-type member and includes the step of engaging the snap-type member over the top edge of the bus bar.

30. The method of claim 26, providing a bus stab stop formed in the bottom portion of the basepan to locate and position a bus stab on the bus bar.

* * * * *